Oct. 16, 1956 M. DEL CONTE 2,766,570
ASSEMBLY FOR PACKING EDIBLES OF SMALL DIAMETER IN CONTAINERS
Filed Jan. 31, 1955 2 Sheets-Sheet 1
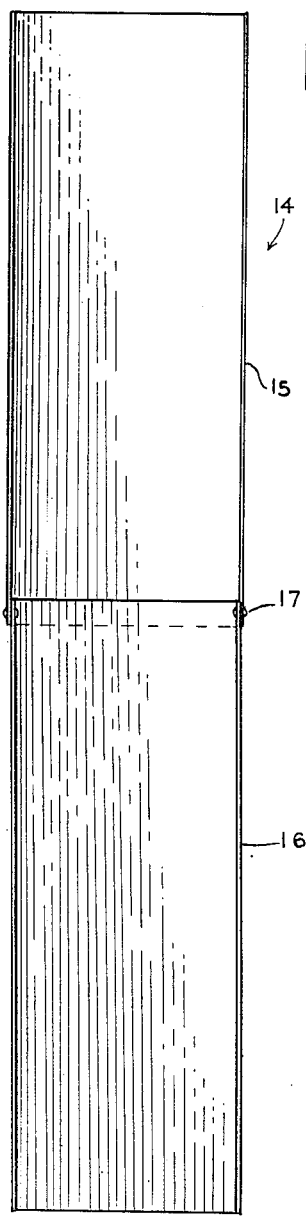
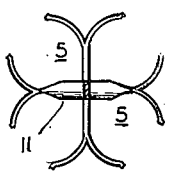
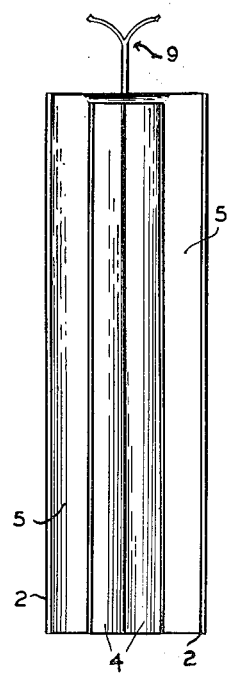
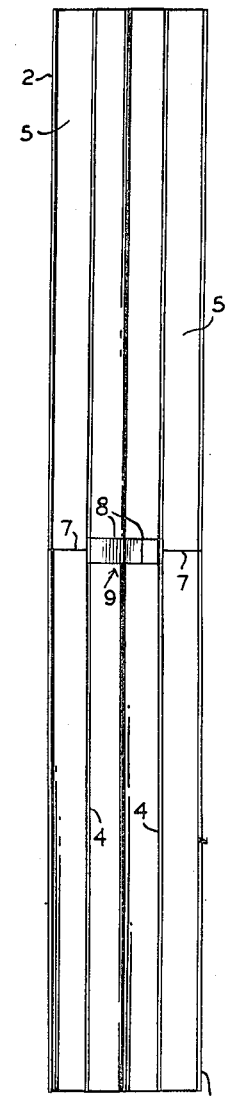
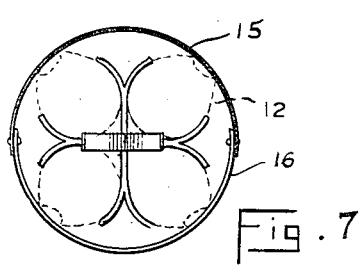
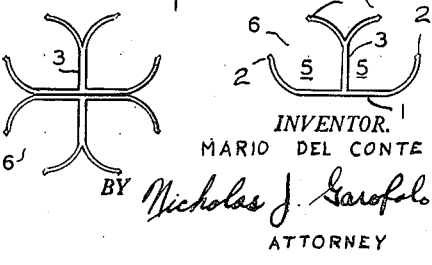
INVENTOR.
MARIO DEL CONTE
BY Nicholas J. Garofolo
ATTORNEY Oct. 16, 1956  M. DEL CONTE  2,766,570
ASSEMBLY FOR PACKING EDIBLES OF SMALL DIAMETER IN CONTAINERS
Filed Jan. 31, 1955  2 Sheets-Sheet 2
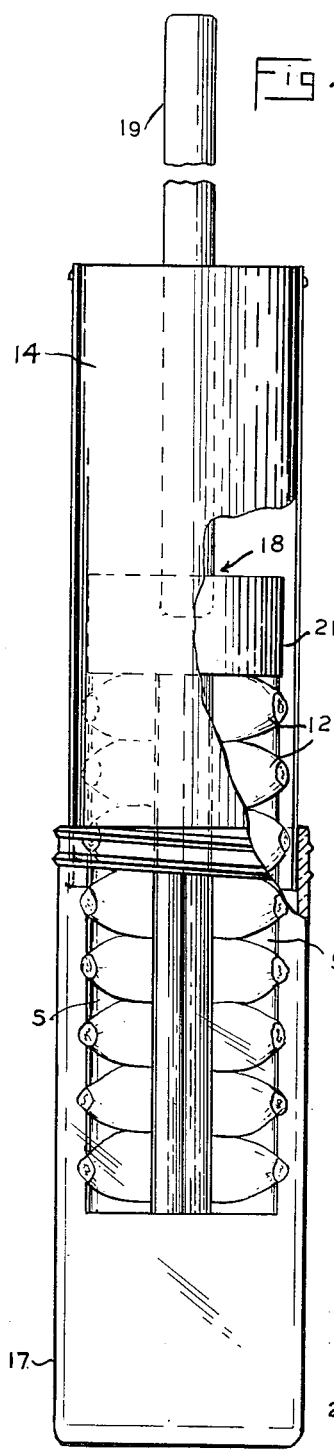
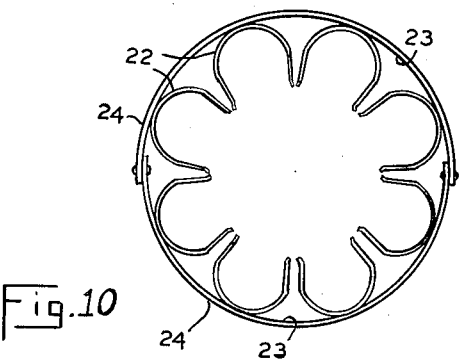
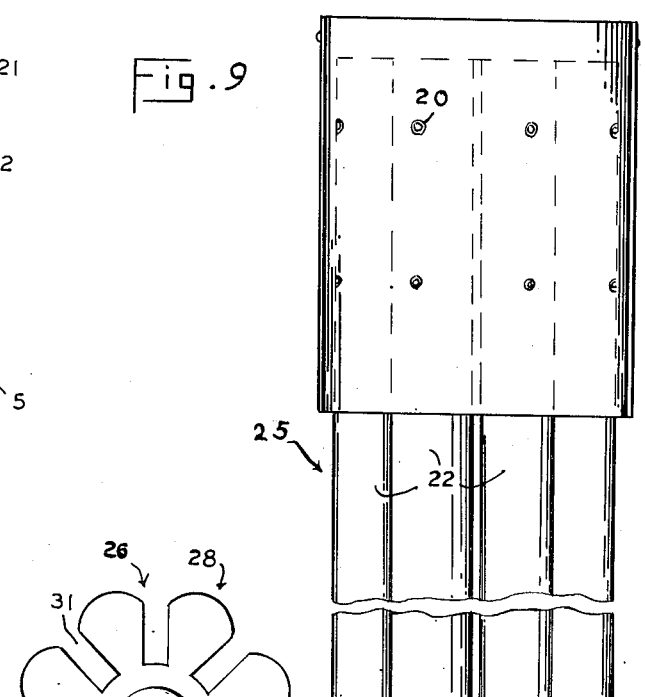
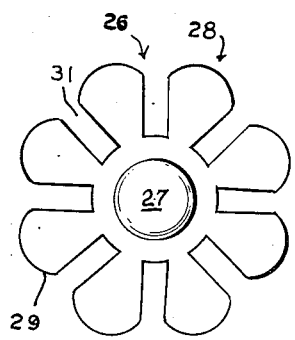
INVENTOR.
MARIO DEL CONTE
BY Nicholas J. Garofalo
ATTORNEY

United States Patent Office 2,766,570
Patented Oct. 16, 1956

2,766,570

ASSEMBLY FOR PACKING EDIBLES OF SMALL DIAMETER IN CONTAINERS

Mario Del Conte, Brooklyn, N. Y.

Application January 31, 1955, Serial No. 485,154

8 Claims. (Cl. 53—258)

This invention pertains to new and useful improvements in devices for packing in containers edibles of small diameter, such as olives, cherries, or the like. The invention, though of wide application, finds particular use in packing olives in glass jars.

As we know, olives are usually packed in glass jars in an orderly and symmetrical manner. They are customarily stacked one above the other in a plurality of columns with the pimento red ends showing through the glass container. This provides an attractive and appealing package to the purchaser and tends to promote sales. Much time and labor, as well as expense are expended in this packaging operation.

A general object of my invention is, therefore, means for packing olives in jars in neatly stacked rows, and doing so in a simple and practical manner with a minimum of time, labor and expense.

I accomplish this by an assembly including a holder for assembling the olives in an orderly, stacked arrangement and means for transferring the orderly arranged olives into the container.

A further object of the invention is the provision of a holder for containing in a plurality of channels olives and means for packing the holder as loaded with olives into a glass jar.

A still further object of the invention is an inexpensive and labor saving method of packing olives in glass containers in orderly stacked columns.

The invention further lies in the construction and structural arrangement of the various component parts of the invention as well as in their cooperative association with one another to provide the objects intended.

The foregoing and other objects and advantages of the invention will appear more fully hereinafter from a consideration of the detailed description which follows, taken together with the accompanying drawings wherein an embodiment of the invention is illustrated. It is to be expressly understood, however, that the drawings are for purposes of illustration and description, and are not to be construed as defining the limits of the invention.

Fig. 1 of the drawings is a top plan view of the holder element;

Fig. 2 is an end view of the holder element;

Fig. 3 is an elevational view of the holder as folded in two;

Fig. 4 is a top end view of Fig. 3;

Fig. 5 is a bottom end view of Fig. 3;

Fig. 6 is a plan of the loader element in extended position;

Fig. 7 is a top end view of the loader and holder elements folded in two;

Fig. 8 is a view illustrating the method of using the invention in passing the holder from the loader to a jar;

Fig. 9 is an elevational view of a modified form of the invention;

Fig. 10 is a top plan of Fig. 9; and

Fig. 11 is top plan of a plunger for use with the modified form of the invention.

In describing the invention in detail reference is now directed to the drawings wherein there is disclosed (Figs. 1–5) a strip or ribbon of thin material, lengthwise of which the central portion 1 thereof is flat and the longitudinal marginal edges 2 are curved over at a slight radius to oppose each other in spaced relation. The upper surface of the strip between the opposed edges 2 is divided lengthwise by the upright stem 3 of a T strip. The arms 4 of the latter curve down at a slight radius in opposed relation to the edges 2. This structure provides a pair of elongated adjacent channels 5. The device is formed of pliable plastic material of thin dimensions by extrusion process, whereby a unitary structure is formed and the walls of the channels are integral with one another. The channels are suitable for holding edibles of small diameter, such as olives, cherries and the like. The curved walls or jaws of the channels are spaced from one another at the entrance 6 to the channels a distance slightly less than the diameter of the edible, so that after the latter is received in a channel the resilient jaws clamp about it to retain it in the channel.

Midway of the device the lower arcuate portion of each edge 2 is slit through at 7 to the tangent point of the flat portion 1. A pair of spaced slits 8 through the arms and stem of the T strip provide a narrow T strip portion 9 at the center of the device. The holder is formed of pliable plastic material and, because of the slits 7 and 8, it can be folded in two. When so folded, as in Figs. 3 to 5, a pair of channels 5 is formed on both sides of the device, back to back. In the folding process the narrow T strip portion 9 remains erect at the top of the fold 11 and serves as a handle or grip for manually lifting the holder.

The holder is used in packing olives, or the like in a jar. To this end, the holder in its unfolded condition is filled with olives or the like, olives 12 being illustrated. The filled holder is then folded over at the middle to the form in Fig. 3 so as to provide four channels or columns of olives. The folded holder is then inserted into a suitable jar. Because of slight protrusion of the olives from between the walls of the channels and because of the tendency of the free ends of the folded holder to restore to unfolded form, much difficulty would be experienced in attempting to insert the filled holder into a jar. For this reason loading means is provided to aid in inserting the filled holder into the jar. The loader 14 comprises a pair of elongated semicircular elements 15 and 16 pivoted together at the upper corner ends 17 in opposed relation to one another to provide a cylinder. The elements 15 and 16 are free to pivot outward to a vertical plane, as in Fig. 6. One of the elements, here 15, is of slightly larger diameter than the other so that the pivoted ends of the one overlap those of the other, whereby the lower ends of the element 16 may be drawn a little into the wider element 15. When the elements are pivoted toward one another they form a cylinder (Figs. 7 and 8). Both elements 15, 16 are of thin flexible material, which may be metal.

In using the loader 14 in conjunction with the holder element, the latter is first filled with olives. The holder is then held in the hand with the olives topside. The loader elements 15, 16 are pivoted to horizontal extended position and placed with the concave wall thereof over the olives, in such manner that the center of the loader is over that of the holder. Then, with a thumb of each hand supporting the underside of the holder and with the fingers of each hand spread around the outer surface of the loader, the holder and loader are manually folded in two. In this operation the folded holder will be confined, as in Fig. 7 in the folded, now cylinder loader. The lower ends of elements 15 and 16 are drawn slightly into one another so as to press the olives well into the channels. The loader containing the holder therein is then inserted into the mouth of the jar 17 a short distance (Fig. 8). A plunger element 18 is used to push the loaded holder from the loading device and down into the jar. The plunger comprises an elongated handle 19 having a cylindrical head 21 at the end thereof. The plunger head is freely received in the loader over the loaded holder; it is then manually forced downward to ease the loaded holder out of the loading device.

When the holder as loaded with olives is contained in the jar, it presents a neat appearance of olives, symmetrically stacked and in attractive orderly arrangement. The jar is then capped, after suitable fluids, such as brine in the case of olives, is poured into the jar. In serving the olives from the jar, the T gripping element 9 provides a means for lifting the holder free of the jar so that access may be had to the olives therein.

In Figs. 9 to 11 is a modified form of the invention, wherein the loader and holder are combined as a unit. In this case a plurality of channels 22, adapted to contain olives or the like, are fixed by suitable fasteners 20 with their backs to the inner wall 23 of each semicircular element 24 of the loader. Before folding, the loading device is pivoted to extended horizontal position and the channels 22 are filled with olives. The unit is then folded into cylinder form. In this form of the invention the channels may extend as at 25 below the lower end of the semicircular elements 24, substantially the depth of the jar into which the olives are to be packed. Manual pressure on the folded elements 24 serves to draw the channels together so as to readily permit their insertion into the mouth of a jar. After inserting the channels containing the olives into the jar, a plunger element 26 is used to remove the olives from the channels. The plunger includes a handle 27 to the end of which is axially secured a head 28. The latter comprises a plurality of radial fingers 29, one for each channel 22. The fingers are adapted to be inserted into the channels from the top of the latter. A radial space 31 between each finger accommodates the walls of adjoining channels when the finger portions of the head 28 are inserted into the channels. In using the plunger the head thereof is positioned with a finger over the topmost olive in each channel. The plunger handle is then gripped and manual pressure is exerted downward thereon with one hand while the channel unit is being drawn upward at the same time by the other hand. When the channel unit has been removed from the jar, the olives will have been eased out of the channels and contained in neat and orderly stacked array in the jar. This modified form of the invention is particularly suited to packing olives in short jars.

Having described my invention, it is my intent, however, to claim the invention not only as shown and described, but also in all such forms and modifications thereof as may be reasonably construed to be within the spirit of the Letters Patent and the scope of the appended claims.

I claim:

1. Means for packing a jar with olives, comprising an elongated holder of pliable plastic material including a plurality of channels coextensive in length with the holder for containing the olives, the holder adapted to be folded in two to provide a multiple of said channels half the length thereof and in back-to-back relation, means for encompassing the holder after it is folded in two and containing the latter as folded, a jar adapted to receive the holder as folded, and plunger means for easing the holder out of the encompassing means and down into the jar.

2. In means as in claim 1, wherein the channels are characterized by resilient walls formed integral with one another the free longitudinal edges of which are spaced apart a distance less than the thickness of the olives to provide a clamping effect upon the olives inserted between them.

3. Means for packing a jar with edibles of small diameter, comprising an elongated holder of pliable plastic material including a plurality of channels formed lengthwise thereof for containing the edibles, the holder adapted to be folded in two to provide a double number of said channels of half size and in back-to-back relation, means for encompassing the holder loaded with the edibles after it is folded in two and containing the holder as folded, and plunger means for pressing the holder out of the encompassing means and down into a jar adapted to receive the holder as it is pressed out of the encompassing means.

4. In means for packing olives into an open mouthed jar, an elongated holder of pliable resilient plastic material characterized by a pair of side-by-side channels formed lengthwise thereof and adapted to receive olives in adjacent relation to one another, the channels being separated by a resilient wall, and the latter wall having a transverse split therethrough at its midpoint enabling the holder to be folded in two so as to provide a double pair of said channels of half length and in back-to-back relation, foldable means defining an elongated trough in its unfolded condition and defining a cylinder in its folded condition, the foldable means when in its unfolded condition adapted to receive the unfolded holder, and the foldable means when being folded with the holder therein adapted to encompass the holder after it has been folded in two preparatory to insertion of the holder in the jar.

5. In the combination of the character described of a holder for containing edibles of small diameter, a jar for receiving the holder as loaded with the edibles, and means for inserting the loaded holder into the jar: a holder formed of resilient plastics material having an elongated base characterized by a flat undersurface and outer longitudinal marginal portions curving upwardly and slightly toward one another, a rib integral with the upper surface of the base and extending lengthwise of the base along the center thereof, the free longitudinal edge of the rib defining a pair of curved portions curving away from one another and in a direction toward the outer curved portions of the base whereby a pair of adjacent parallel channels lengthwise of the holder is formed, the opposed walls of each channel adapted to releasably hold the edibles received therebetween, and a transverse slit being provided through the curved portions of the several walls and through the rib to the base whereby the holder is foldable at the split in two to provide four channels having their base wall portions in back-to-back relation.

6. A holder in the combination as set forth in claim 5 wherein a second split in close parallel spaced relation to the first split is provided through only the curved portions defined by the rib and through the rib to the base, whereby, upon folding the holder in two, a handle for the holder is provided at the fold line and is defined by the material of the rib and the curved portions thereof existing between the two splits in the holder.

7. In the combination of a jar and a holder of edibles of small diameter receivable in the jar, a holder formed of pliable resilient plastics material characterized by a pair of parallel channels lengthwise of the holder and defined by a pair of adjacent walls along the center of the holder curving away from one another and by a pair of outer walls one curving inwardly toward one of the adjacent walls and the other curving inwardly toward the other adjacent wall, the free longitudinal edges of the walls of each channel being spaced apart less than the thickness of edibles received in the channel whereby a clamping hold is exerted upon the edibles, and the several curving walls being characterized by a transverse split at the center through the adjacent walls and partially through the outer walls, whereby the holder is foldable at the split in half so as to reduce the pair of channels to half size and in back-to-back relation, the holder as so folded being receivable in the jar.

8. In the holder as in claim 1 wherein a second split parallel to the first and slightly spaced therefrom is provided through only the adjacent walls, whereby upon folding of the holder in two an upright stem is provided by the material between the two splits at the fold line and serves as a means to enable manually lifting the holder out of the jar.

References Cited in the file of this patent

UNITED STATES PATENTS

| | | |
|---|---|---|
| 1,759,185 | Campbell | May 20, 1930 |
| 2,514,988 | Bell | July 11, 1950 |
| 2,605,187 | Stiehm | July 29, 1952 |
| 2,628,914 | Stiehm | Feb. 17, 1953 |
| 2,638,256 | Hagen et al. | May 12, 1953 |
| 2,661,883 | Francisco | Dec. 8, 1953 |